IIIIIIIIIIIIII US010309074B2

(12) United States Patent
Tozer

(10) Patent No.: US 10,309,074 B2
(45) Date of Patent: Jun. 4, 2019

(54) PRE-CAST CONCRETE FOUNDATION OF MODULAR CONSTRUCTION FOR TELECOMMUNICATION OR WIND TURBINE TOWER

(71) Applicant: 649119 N.B. Inc., Fredericton, New Brunswick (CA)

(72) Inventor: Robert Tozer, Whitney (CA)

(73) Assignee: 649119 N.B. INC., Miramichi, New Brunswick (CA)

( * ) Notice: Subject to any disclaimer, the term of this patent is extended or adjusted under 35 U.S.C. 154(b) by 0 days.

(21) Appl. No.: 15/009,020

(22) Filed: Jan. 28, 2016

(65) Prior Publication Data

US 2017/0183840 A1    Jun. 29, 2017

(30) Foreign Application Priority Data

Dec. 23, 2015  (CA) ..................................... 2916228

(51) Int. Cl.
*E02D 27/00*  (2006.01)
*E02D 27/01*  (2006.01)
*E02D 27/42*  (2006.01)

(52) U.S. Cl.
CPC ......... *E02D 27/016* (2013.01); *E02D 27/425* (2013.01); *E02D 2200/1685* (2013.01); *E02D 2250/0046* (2013.01); *E02D 2600/40* (2013.01)

(58) Field of Classification Search
CPC ................ E02D 27/016; E02D 27/425; E02D 2200/1685; E02D 2250/0046; E02D 2600/40

(Continued)

(56) References Cited

U.S. PATENT DOCUMENTS 6,575,665 B2 *  6/2003  Richter ..................... B63B 3/04
                                                        114/125
6,672,023 B2 *  1/2004  Henderson .............. E02D 27/42
                                                        405/244

(Continued)

OTHER PUBLICATIONS

International Search Report dated Aug. 26, 2016 in PCT/CA2016/050093.

*Primary Examiner* — Joshua J Michener
*Assistant Examiner* — James Buckle, Jr.
(74) *Attorney, Agent, or Firm* — Perkins Coie LLP; Viola T. Kung

(57) ABSTRACT

A modular foundation design for supporting a wind turbine or telecommunication tower, comprised of pre-cast concrete modules offering advantages of off-site manufacture and ease of transportation, but which deign is simple to construct. A base slab is provided comprised of sub-modules/base members arranged together in juxtaposed position which together provide a horizontal surface on which pre-cast pipe members may be stacked in end-to-end position to form a pedestal. Anchor rods extend through the pipe members into screw retainers in the base members, which rods serve to not only post-tension the pipe members and secure them together, but further advantageously serve to retain the base members together thereby assisting in distributing forces and loads applied to one sub-module/base member over the entire base slab. Coupling means to further couple the base members together may be added to better retain the base members together and still further improve distribution of forces.

15 Claims, 11 Drawing Sheets

(58) Field of Classification Search
USPC .................................................... 52/223.1
See application file for complete search history.

(56) References Cited

U.S. PATENT DOCUMENTS

| | | | | |
|---|---|---|---|---|
| 7,618,217 | B2* | 11/2009 | Henderson | E02D 27/12 |
| | | | | 405/239 |
| 7,805,895 | B2* | 10/2010 | Kristensen | E02D 27/42 |
| | | | | 52/169.6 |
| 8,359,798 | B2 | 1/2013 | Armbrecht et al. | |
| 8,468,776 | B2* | 6/2013 | Cortina-Ortega | F03D 13/20 |
| | | | | 52/831 |
| 8,720,139 | B2* | 5/2014 | Henderson | E04C 5/125 |
| | | | | 405/229 |
| 9,011,047 | B2* | 4/2015 | Han | E02B 17/025 |
| | | | | 405/224 |
| 9,096,985 | B1* | 8/2015 | Phuly | E02D 27/42 |
| 9,175,670 | B2* | 11/2015 | Lockwood | E04H 12/16 |
| 9,359,993 | B2* | 6/2016 | Garcia Maestre | F03D 1/001 |
| 2007/0269273 | A1* | 11/2007 | Henderson | E02D 27/12 |
| | | | | 405/239 |
| 2011/0061321 | A1* | 3/2011 | Phuly | E02D 27/42 |
| | | | | 52/297 |
| 2011/0131899 | A1 | 6/2011 | Voss et al. | |
| 2014/0044554 | A1* | 2/2014 | Lafferty | E02D 27/42 |
| | | | | 416/244 R |
| 2014/0248090 | A1* | 9/2014 | Fernandez Gomez | |
| | | | | E02B 17/025 |
| | | | | 405/196 |

* cited by examiner

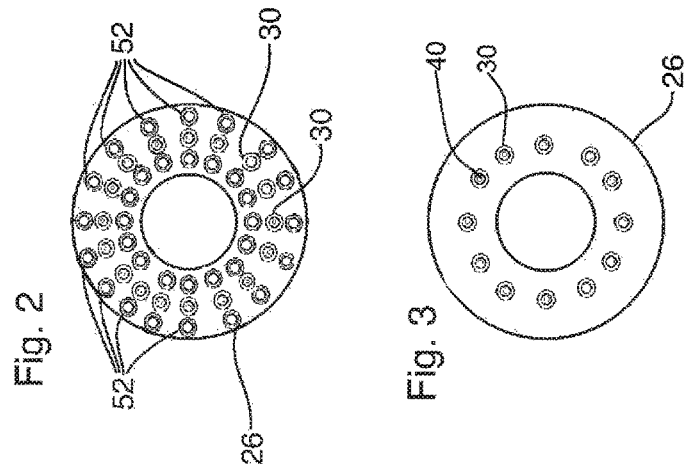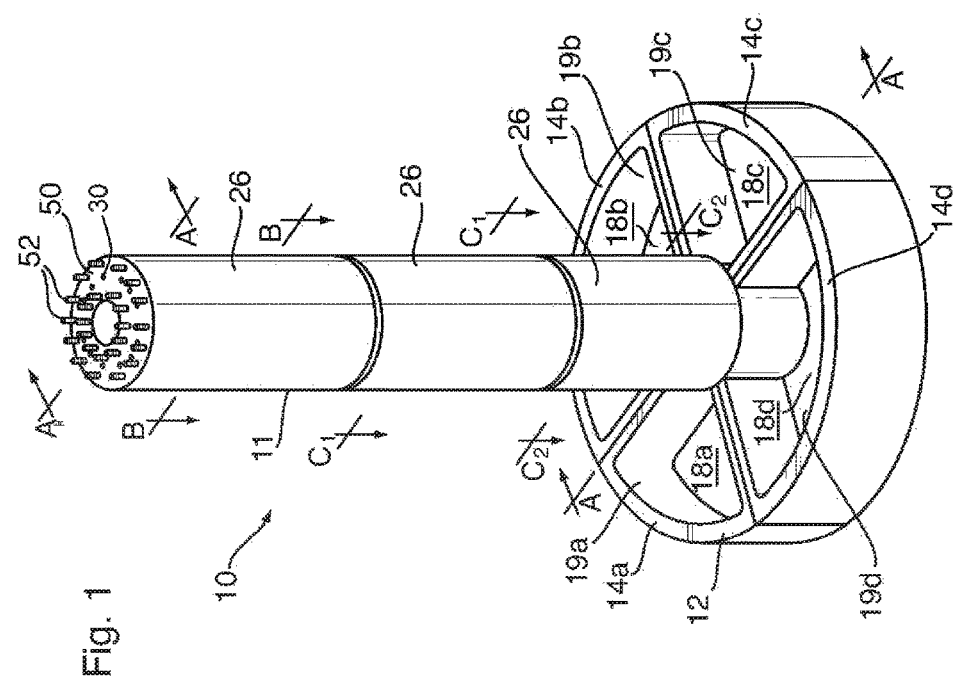

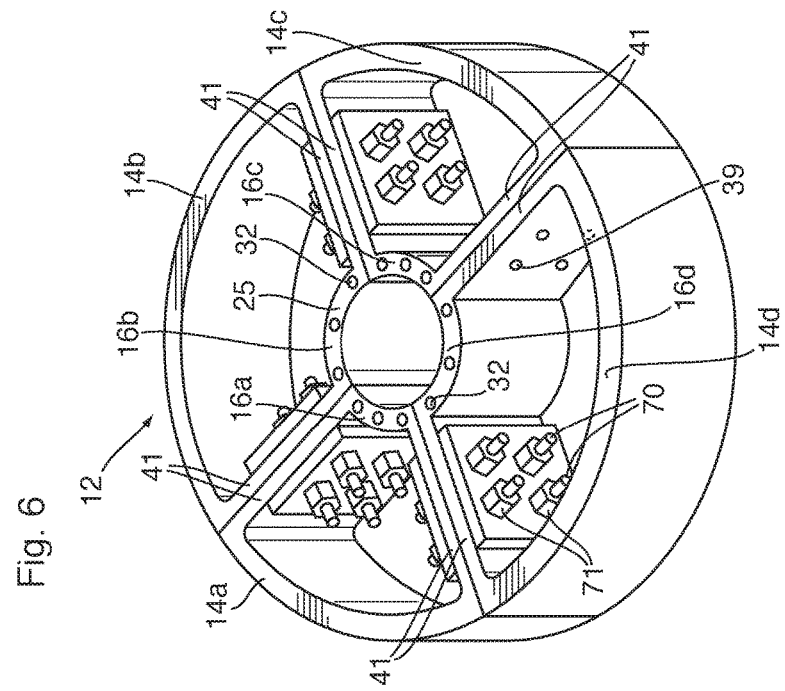
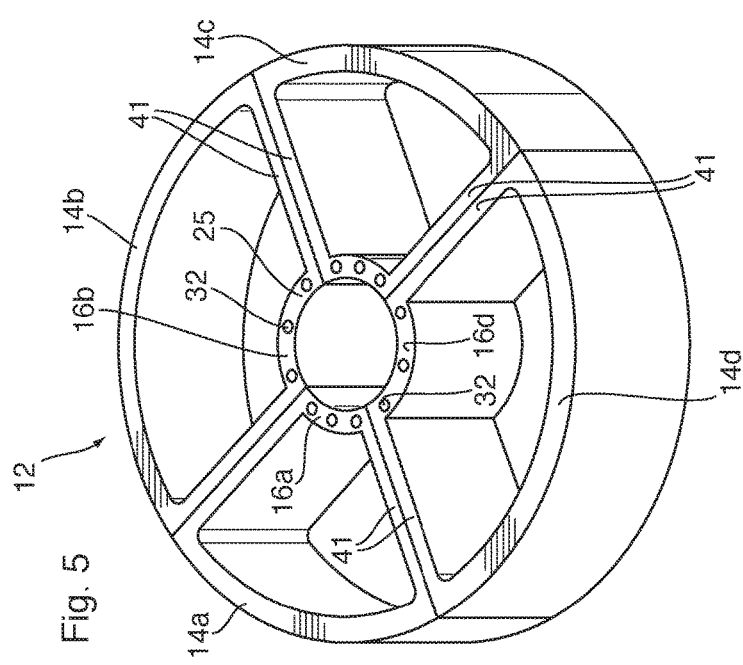

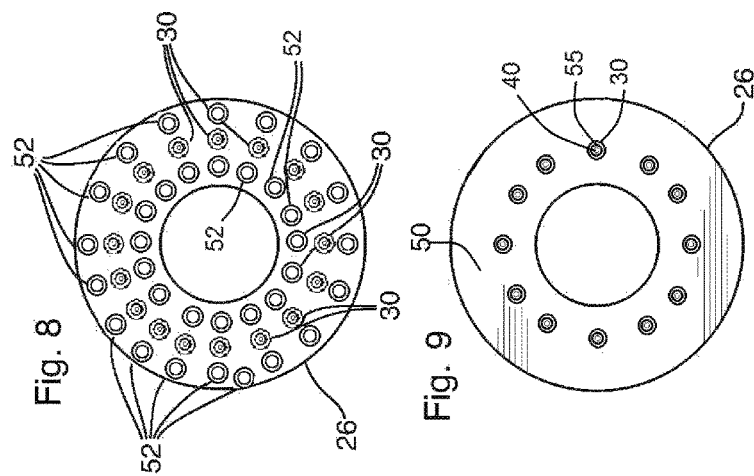
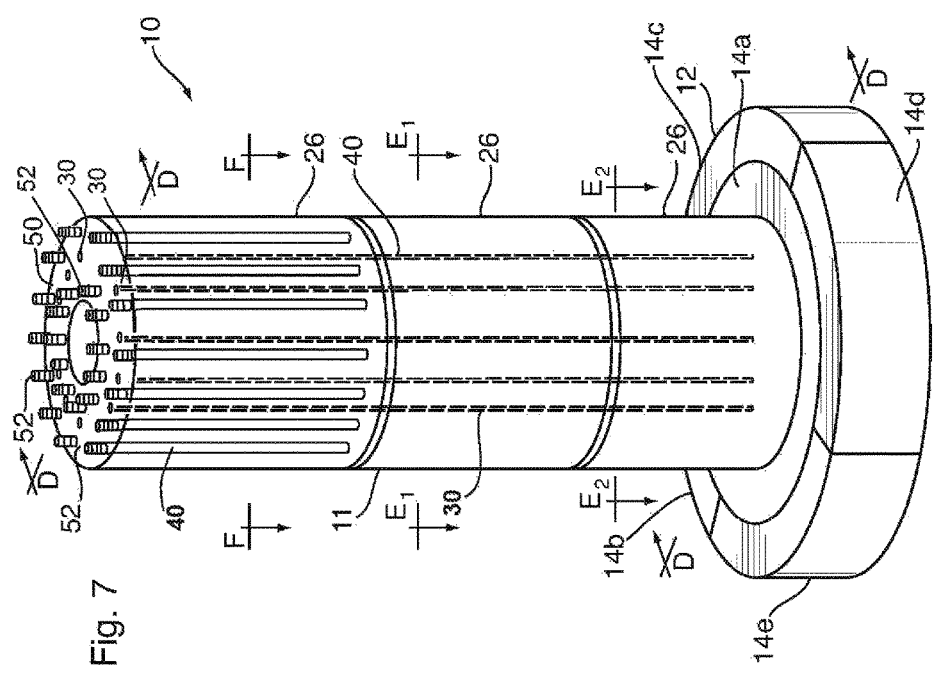

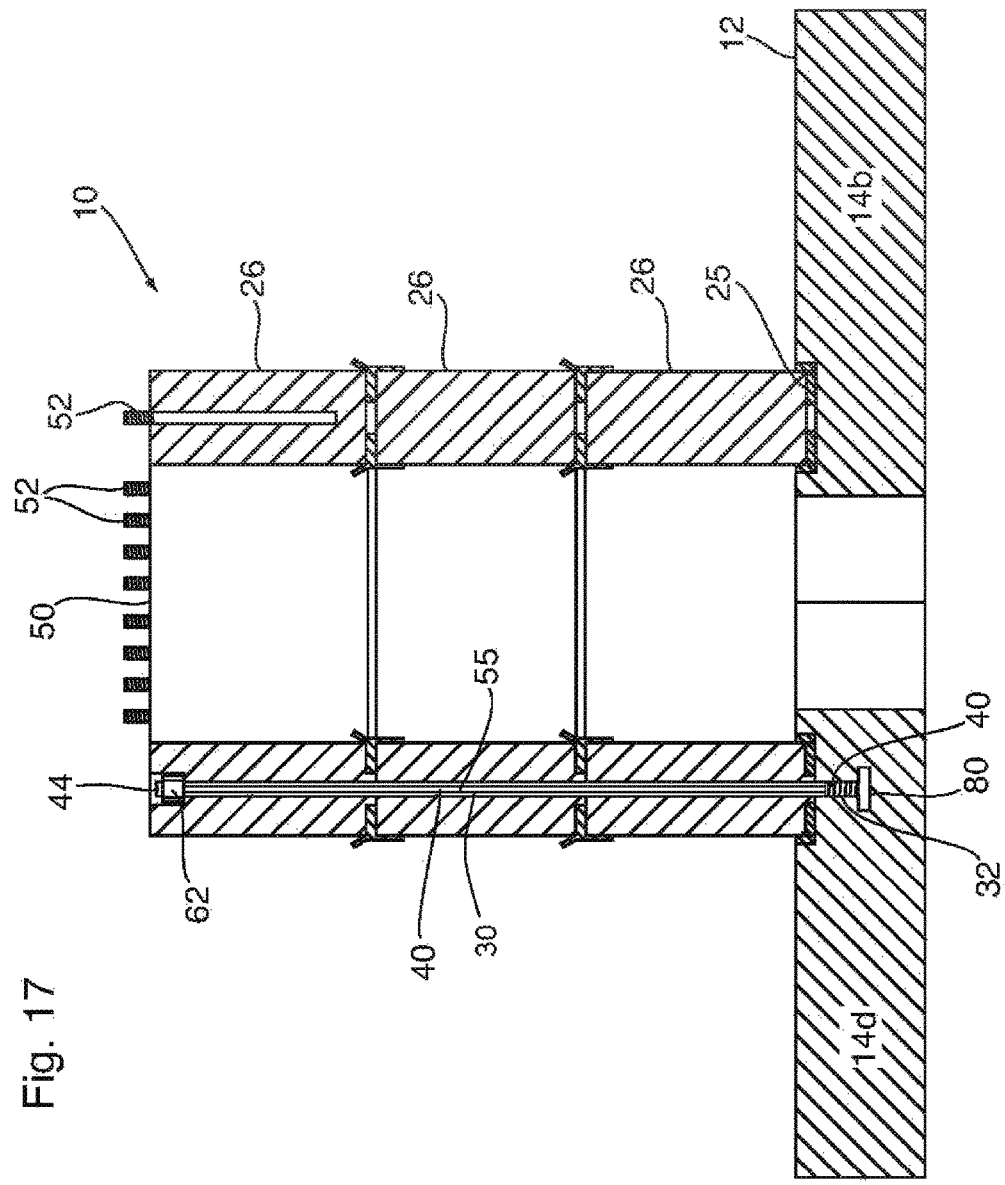

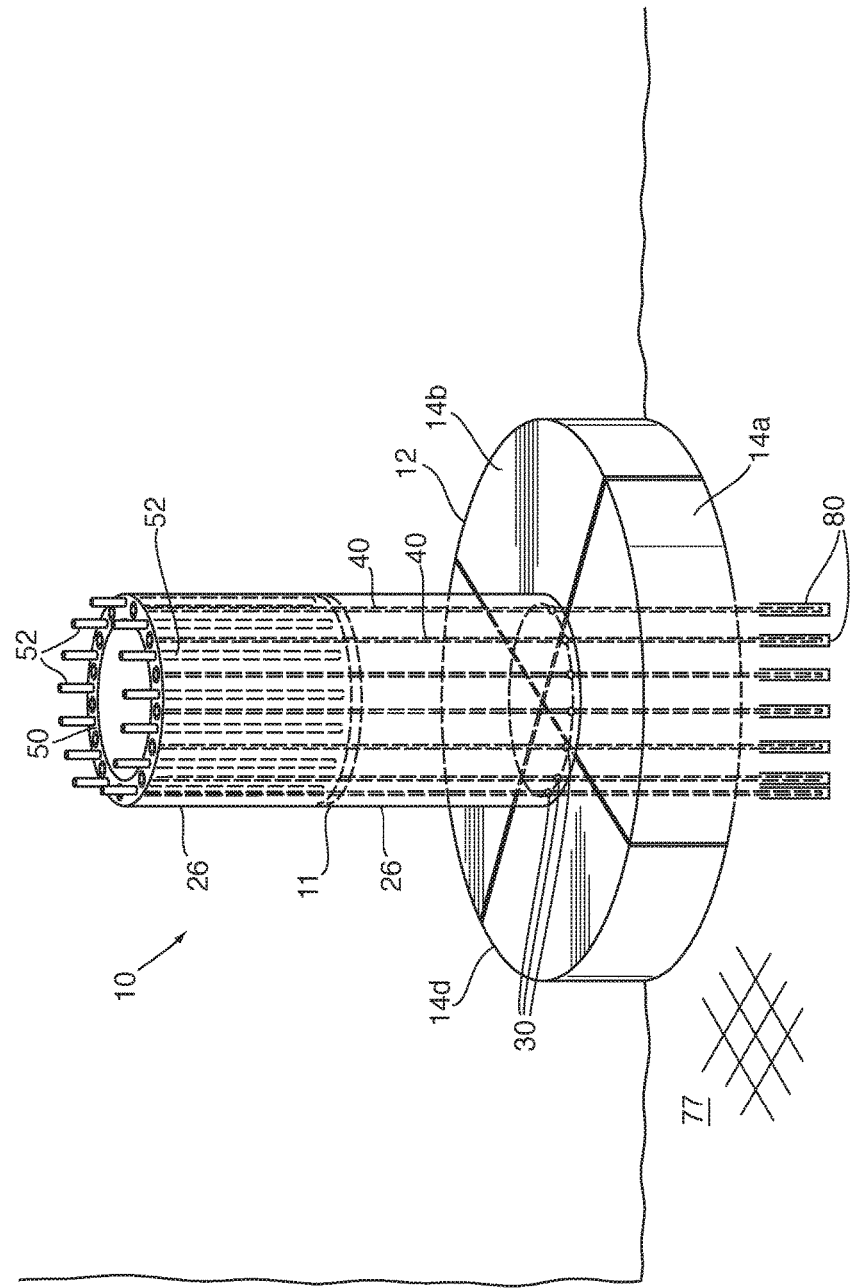

PRE-CAST CONCRETE FOUNDATION OF MODULAR CONSTRUCTION FOR TELECOMMUNICATION OR WIND TURBINE TOWER

The present application claims the benefit of Canadian Application No. 2,916,228, filed Dec. 23, 2015 under 119 (a), which is incorporated herein by reference in its entirety.

FIELD OF THE INVENTION

The present invention relates to concrete foundations for cell phone and wind turbine towers and the like more particularly the present invention relates to a pre-cast concrete foundation of a particular construction and assembly, comprised of discrete modules which may be pre-cast off-site and transported via truck to be assembled at site.

BACKGROUND OF THE INVENTION

This background and documents mentioned below are provided for the purpose of making known information believed by the applicant to be of possible relevance to the present invention, and in particular allowing the reader to understand advantages of the invention over devices and methods known to the inventor, but not necessarily public. No admission is necessarily intended, nor should be construed as admitting, that any of the following documents or methods known to the inventor constitute legally citable and relevant prior an against the present invention.

Concrete foundations for telecommunications towers such as cell phone towers as well as wind turbine towers are now frequently employed. Such concrete foundations, particularly in terrestrial applications (as opposed to "at sea" applications) serve to support and prevent such tower structures from toppling, and generally avoid the need for additional supporting guy wires radially extending outwardly from the lower, thus avoiding the resultant large spatial area that such guy wires surrounding the tower otherwise consume.

U.S. Pat. No. 9,096,985 entitled "Foundation with Stab, Pedestal, and Ribs for Columns and Towers" teaches a foundation with a number of components, namely a central vertical pedestal, a horizontal bottom support slab, and plurality of radial reinforcing ribs extending radially outwardly from the pedestal, and a three-dimensional network of vertical, horizontal, diagonal, radial and circumferential post-tensioning elements embedded in the footing (support slab) which reduce stress amplitude and deflections. Disadvantageously, while such configuration allegedly allows pre-casting of some components to thereby reduce the amount of concrete cast in situ, some in situ casting of concrete is still required (ref. col. 3, line 65-col. 4, line 12). In situ casting presents a problem in harsh weather conditions, where proper curing of cast concrete structures may be inhibited or prevented.

US 2014/0215941 entitled "Tower Foundation" teaches a tower foundation comprised of a base slab, cruciate (cruciform) pillar slabs (two shown) stacked on each other and on such base slab, and a crown slab "capping" such structure. All slabs are of precast concrete. Steel guide rods are provided that have externally threaded ends to hold the individual elements components together and exert a compressive stress when tightened. Disadvantageously, however, the base slab disclosed in US 2014/0215941, as further referenced in U.S. Pat. No. 5,257,489 incorporated therein by reference, is of a solid (non-modular) configuration. For large towers such as large wind turbines towers where the wind turbine generates upwards of 7 MW and the resulting weight and wind forces acting thereon are substantial, the base slab is required to be large. In such circumstances a foundation design providing for modular construction of the base dictates that the pre-cast integral base member is of such a size that transportation thereof via truck to an installation site becomes difficult and expensive, if not impossible. Moreover, cell phone and wind turbine towers typically being cylindrical cannot therefore be directly coupled to cruciate pillar slabs, and such design thus further requires the circular crown slab mounted on such cruciate slabs to allow coupling to a circular base of a the tower to the foundation. Disadvantageously, however, in the foundation design of US 2014/0215841, circular crown slab 13 is thus unsupported in regions in which it does not overlie the cruciate pillar slabs. Additional thickness and reinforcement (and thus additional weight) is thus required to allow the crown slab to withstand bending forces which are exerted thereon at all locations about its periphery by the wind turbine tower to which it is coupled. Such additional weight of the crown slab negatively exerts additional compressive forces on the cruciate members and thus also the base member, requiring them in turn to be of thicker construction and thus adding still further greater expense to the foundation of such design.

US 2014/0033628 (now U.S. Pat. No. 9,175,670) entitled "Precast Concrete Post Tensioned Segmented Wind Turbine Tower" teaches a tower of stacked vertical cylinders, held together by post-tensioning of external and/or internal tendons (cables). The stacked cylinders rest on a concrete foundation 30, which foundation is not disclosed as being modular. Use of such cables 38, where disclosed as being used internally, due to their flexible nature, make it difficult to place such cables in apertures in the pre-cast stacked cylinders, due to the inability to "push" on such flexible cables so as to insert them in pre-cast apertures in the cylinders. Moreover, due to the need to anchor such (internal) cables at one end in the base 30, and as cables are not amendable to being secured into helical inserts, the base must be designed to allow access to cable ends exiting the base, as shown in FIG. 20, to allow such cable ends to be anchored. Such typically, as shown in FIG. 20, requires curved cable runs within base 30. Curved cable runs are definitively inferior to direct linear path lines, as such direct linear paths allow application of 100% compressive loading to members to offset any tensile loads (concrete having high compressive strength but poor tensile strength). Practically, therefore, tower members of this construction, due to use of flexible cables, may have increased complexity in construction and thus time to construct such foundation, to say nothing of decreased strength and resistance of components such as the base member to withstand loads applied thereto due to lateral and multi-axial forces applied to the tower due to arcuate cable runs therein.

SUMMARY OF THE INVENTION

It is an object of the present invention to provide a design for a concrete foundation for a tower, which foundation may be constructed from a plurality of modular concrete components, each of which is pre-cast off-site and under controlled conditions, and subsequently transported to site. Such avoids the negative factors of in situ casting of concrete during inclement weather and possible detrimental effect on the curing and thus the ultimate strength of such concrete components.

It is a further object of the present invention to provide a design for a concrete foundation for a tower whose modular components are all sufficiently small to allow compliance with a majority of highway load restrictions to thereby increase ability to transport such components to site via truck.

It is a further object of the present invention to further provide a design for a concrete foundation for a tower which does not require additional components, such as circular crown slabs, which components must be strengthened in areas where they are not supported from below, thereby adding additional cost.

It is a still further object of the present invention to further provide a design for a concrete foundation for a tower whose modular components are configured to allow more direct application of post-tensioning forces to more directly apply compressive forces to the modular concrete components and thereby avoid or reduce imparting any significant tensile stresses in any of the pre-cast concrete segments.

Accordingly, in order to overcome some of the disadvantages of the prior art designs and/or in order to further realize one or more of the above objects of the invention, in a first broad embodiment of the present invention, the invention comprises a modular concrete foundation for supporting a tower, said foundation comprised of a plurality of pre-cast modules transported to site for assembly, and including:

(i) a plurality of pre-cast concrete base members, each having a substantially planar upwardly-facing horizontal surface thereon, each base member arranged in mutually juxtaposed position to form a base slab wherein said upwardly-facing surfaces thereon together form a horizontal pedestal-mounting surface, each base member having a plurality of parallel, spaced-apart anchor rod retaining apertures therein spaced in a circular arc about said upwardly-facing horizontal surface thereof, each anchor rod retaining aperture extending vertically downwardly from said upwardly-facing horizontal surface and containing therewithin an anchor rod;

(ii) a plurality of substantially cylindrical, hollow pre-cast concrete pipe members, mounted one upon the other in vertical stacked arrangement to form a vertical pedestal having a hollow interior, an uppermost of said pipe members having at an uppermost portion thereof coupling means preferably cast therein about a circular periphery thereof to allow coupling to a tower mounted thereon, a lowest of said plurality of stacked pipe members positioned on said pedestal-mounting surface so that a lower circular periphery of said lowest of said stacked is pipe members is positioned on and overlies respective portions of said upwardly-facing horizontal surfaces of said base members;

(iii) each of said stacked pipe members having a plurality of parallel, spaced-apart longitudinally-extending anchor rod containing apertures therein corresponding in number to said plurality of longitudinally-extending anchor rod retaining apertures in said base members, each anchor rod containing aperture extending a vertical height of a respective of said pipe members and uniformly spaced around a periphery of each of said pipe members in a manner to allow, upon said pipe members being stacked one upon the other, alignment of said anchor rod containing apertures in each of said pipe members with corresponding anchor rod containing apertures in each of said other pipe members and said anchor rod retaining apertures in each of said base members; and (iv) a plurality of anchor rods, corresponding in number to said plurality of longitudinally-extending anchor rod retaining apertures in said base members, each positioned in a corresponding of said anchor rod containing apertures in said pipe members, one end of each of said plurality of anchor rods positioned in a corresponding one of said anchor rod retaining apertures in said base members and at another mutually-opposite end having tensioning means imparting a tensile loading on each of said anchor rods;

wherein said plurality of anchor rods pass through a respective of said anchor rod containing apertures and when tensioned impart a compressive load on said pipe members to retain same together and to further retain said lowest of said pipe members overlying said pedestal-mounting surface on said base slab.

It is preferred, although not absolutely necessary, that the uppermost portion of the uppermost of the pipe members, namely the portion of the tower foundation to which the tower is attached, be at ground level. Accordingly, in such preferred usage of the present invention, ground is excavated at the site of the tower, and the foundation constructed in the excavated site, with the uppermost portion of the uppermost pipe member of the foundation being at ground level. Thereafter, after insertion of the anchor rods, and preferential pumping of grout down the anchor rod containing apertures to seal the anchor rods therein, the removed ground may be re-introduced on top of the base slab and surrounding the pedestal, up to the level of the ground, to thereby assist in preventing toppling of the foundation due to lateral forces applied to the tower to which the foundation is coupled.

In a first refinement of the aforementioned modular pre-cast concrete foundation of the present invention, the base members are retained together in said mutual juxtaposed position, at least in part, by said anchor rods in said lowest of said pipe members extending therefrom into said anchor rod retaining apertures in said base members.

In a further refinement, however, each of said base members further having coupling means to couple said base members together in said mutually juxtaposed position and to thereby distribute forces applied to one base member to other base members to thereby distribute such forces over other regions of the base slab.

Preferably, each of said base members having anchor rod securement means situated at each of said anchor rod retaining apertures and cast into each respective base member, which secure one end of a respective of said anchor rods to a respective base member.

In a further embodiment, the rod securement means comprises a metallic threaded insert, cast within a respective base member and situated at a base of each of said anchor rod retaining apertures in said base members, which threaded insert when one end of a respective of said anchor rods is threadably inserted therewithin secures said one end of said anchor rod to a respective of said base members.

In one embodiment, the modular pre-cast concrete base members each comprise pie-slice segments of a circular disk, and when arranged in said mutually juxtaposed position together form a circular disk for said base slab. Again, such base members may further be provided with coupling means to couple said base members together, along mutually parallel sides of each pie-shaped slice, to thereby distribute forces applied to one base member to other base members to thereby distribute such forces over other regions of the base slab.

In a preferred embodiment, the anchor rod containing apertures in each of said pipe member each further contain an elongate hollow plastic sleeve extending substantially a length of each of said anchor rod containing apertures, possessing both exterior and interior undulations or corrugations; and the pipe members are each cast with said sleeves surrounding respectively interior peripheries of each of said anchor rod containing apertures in each of said pipe members. The undulations assist in bonding the plastic sleeves to the interior of the apertures, and any anchor rods inserted into said apertures, and grout poured around them, so assist in such anchor rods bonding to the sleeves and thus the pipe or base members containing such apertures. In such further embodiment, after said anchor rods are inserted in said anchor rod containing apertures, grout is further injected in said plastic sleeves to bond said anchor rods to said sleeves.

Preferably, in order to seal respective interfaces between stacked pipe members, in a preferred embodiment each of the pipe members, when assembled in said stacked configuration, have grout inserted at an interface between each of said pipe members.

In a second embodiment of the present invention, base members are not only modular but of a construction to cause overlap between each of the base members making up the base slab. The points of overlap between a first (central) base member, and the remaining (peripheral) base members is forcibly connected and held together by the same anchor rods applying post-tensioning to the pipe members. Such design provides both a simple and effective way of simultaneously providing post-tensioning to the pipe members but at the same time and in addition securing the base members together to form a unified base slab capable of more evenly applying forces and stresses which might otherwise be concentrated on one or only a few of the base members and distributing same more evenly over the remainder of the base members making up the base slab.

Accordingly, in a second embodiment of the invention, the pre-cast concrete foundation comprises:
(i) a plurality of discrete pre-cast concrete base members arranged in juxtaposed position to form a base slab having a horizontal pedestal-mounting surface, said horizontal pedestal-mounting surface comprised of a first of said base members having a periphery, remaining base members when in said mutually juxtaposed position surrounding said first base member and said periphery thereof. Portions of a periphery of each of said remaining base members overlapping with a portion of said periphery of said first base member, said base slab having a plurality of mutually parallel, spaced-apart anchor rod containing apertures spaced in a circular arc on said horizontal pedestal-mounting surface, beneath which and in alignment therewith are located respectively a corresponding plurality of anchor rod retaining apertures, each containing therewithin an anchor rod;
(ii) a plurality of substantially cylindrical, hollow pre-cast concrete pipe members, mounted one upon the other in vertical stacked arrangement to form a vertical pedestal having a hollow interior, an uppermost of said pipe members having, at an uppermost portion thereof, a plurality of coupling means uniformly radially spaced about a circular periphery thereof to permit coupling of a tower thereto, a lowest of said plurality of stacked pipe members positioned on said pedestal-mounting surface so that a lower circular periphery of said lowest of said stacked pipe members is positioned on and overlies said pedestal-mounting surface of said base slab;
(iii) each of said stacked pipe members having a plurality of parallel, spaced-apart longitudinally-extending anchor rod containing apertures therein corresponding in number to said plurality of longitudinally-extending anchor rod containing apertures in said pedestal-mounting surface, each anchor rod containing aperture in said pipe member extending a vertical height of a respective of said pipe members and uniformly spaced around a periphery of each of said pipe members in a manner to allow, upon said pipe members being stacked one upon the other, alignment of said anchor rod containing apertures of each of said pipe members with corresponding anchor rod containing apertures of each of said other pipe members and said anchor rod containing apertures in said base slab; and
(iv) a plurality of anchor rods, corresponding in number to said plurality of longitudinally-extending anchor rod containing apertures in said pipe members, each positioned in a corresponding of said anchor rod containing apertures in said pipe members and said base slab, one end of each of said plurality of anchor rods positioned in a corresponding one of said anchor rod retaining apertures in said base slab and at another mutually opposite end having tensioning means imparting a tensile loading on each of said anchor rods;
   wherein said plurality of anchor rods pass through a respective of said anchor rod containing apertures and when tensioned impart a compressive load on said pipe members to retain same together and to further retain said lowest of said pipe members overlying said pedestal-mounting surface on said base slab and further retain said base members together in said base slab.

In a sub-embodiment of such second embodiment, the horizontal pedestal-mounting surface is comprised of said first of said base members, said first of said base members having therein said anchor rod containing apertures; and said remaining base members possess said anchor rod retaining apertures, vertically aligned respectively with said anchor rod containing apertures in said first base member. Said anchor rods secure together the points of overlap between the first base member and the remaining base members together by compressing such components together and pre-stressing such areas of the base with an initial compressive force, thereby creating a rigid base slab of greater mass moment of inertia as compared to a single base member and which distributes forces applied to one or a few of the base members more evenly over the entire base slab, thereby increasing the ability of the tower to withstand applied loading.

In an alternative sub-embodiment of such second embodiment, the horizontal pedestal-mounting surface is comprised of a portion of said periphery of said remaining base members overlapping said first base member, each of said remaining base members having therein said anchor rod containing apertures; and said first base member possesses said anchor rod retaining apertures, vertically aligned respectively with said anchor rod containing apertures in said remaining base members. Said anchor rods again secure the points of overlap between the first base member and the remaining base members together, again similarly creating a rigid base slab which is thus capable of distributing forces applied to one or a few of the base members more evenly over the entire base slab, thereby increasing the ability of the tower to withstand applied loading.

A further refinement of the foundation of the present invention, which is applicable to each of the above first and second embodiments and may be used where the base slab is situated on a rock formation, the anchor rods may extend through the base slab and into the rock formation on which the base slab is situated.

Accordingly, in such further refinement, instead of one end of each anchor rod being threadably inserted into and being retained by the base slab, such one end of each anchor rod extends through the base slab and into rock below the base slab.

Accordingly, in such further refinement the modular foundation for a tower comprises A modular foundation for supporting a tower, comprised of a plurality of pre-cast concrete modules transported to site for assembly, and including:

(i) a plurality of pre-cast concrete base members, each having a substantially planar upwardly-facing horizontal surface thereon, each base member arranged in mutually juxtaposed position to form a base slab wherein said upwardly-facing surfaces thereon together form a horizontal pedestal-mounting surface, each base member having a plurality of parallel, spaced-apart anchor rod containing apertures therein spaced in a circular arc about said upwardly-facing horizontal surface thereof, each anchor rod containing aperture extending vertically downwardly from said upwardly-facing horizontal surface and containing therewithin an anchor rod;

(ii) a plurality of substantially cylindrical, hollow pre-cast concrete pipe members, mounted one upon the other in vertical stacked arrangement to form a vertical pedestal having a hollow interior, an uppermost of said pipe members having at an uppermost portion thereof coupling means about a circular periphery thereof to allow coupling to a tower mounted thereon, a lowest of said plurality of stacked pipe members positioned on said pedestal-mounting surface so that a lower circular periphery of said lowest of said stacked is pipe members is positioned on and overlies respective portions of said upwardly-facing horizontal surfaces of said base members;

(iii) each of said stacked pipe members having a plurality of parallel, spaced-apart longitudinally-extending anchor rod containing apertures therein corresponding in number to said plurality of longitudinally-extending anchor rod containing apertures in said base members, each anchor rod containing aperture extending a vertical height of a respective of said pipe members and uniformly spaced around a periphery of each of said pipe members in a manner to allow, upon said pipe members being stacked one upon the other, alignment of said anchor rod containing apertures in each of said pipe members with corresponding anchor rod containing apertures in each of said other pipe members and said anchor rod containing apertures in each of said base members; and (iv) a plurality of anchor rods, corresponding in number to said plurality of longitudinally-extending anchor rod containing apertures in said base members, each positioned in a corresponding of said anchor rod containing apertures in said pipe members, one end of each of said plurality of anchor rods passing through said anchor rod containing apertures in said base slab and threadably secured in rock immediately beneath said base slab, and at another mutually-opposite end thereof proximate circular periphery of said uppermost of said pipe members having tensioning means imparting a tensile loading on each of said anchor rods;

wherein said plurality of anchor rods pass through a respective of said anchor rod containing apertures and when tensioned impart a compressive load on said pipe members to retain same together and further retain said lowest of said pipe members overlying said pedestal-mounting surface on said base slab.

In instances where the tower interface of the foundation is at ground level the bulk of the foundation, and in particular the base slab, is below ground level and sits in an excavated portion of the ground. Upon placement of the base members and pipe members in the excavated portion of the ground, the originally-removed portion of the ground in forming such excavated portion can be used as fill above the base slab and around the formed pedestal, to increase the resistance of the foundation to toppling due to lateral forces applied to the tower.

The above summary of the invention does not necessarily describe all features of the invention. For a complete description of the invention, reference is to further be had to the drawings and the detailed description of some preferred embodiments, read together with the claims.

BRIEF DESCRIPTION OF THE DRAWINGS

Further advantages and other embodiments of the invention will now appear from the above along with the following detailed description of the various particular embodiments of the invention, taken together with the accompanying drawings each of which are intended to be non-limiting, in which:

FIG. 1 is a perspective view of a first embodiment of the present invention directed to a concrete foundation of modular construction for supporting a tower;

FIG. 2 is a partial cross-sectional view of the foundation of FIG. 1, taken along plane B-B;

FIG. 3 is a partial cross-sectional view of the foundation of FIG. 1, taken along plane $C_1$-$C_1$ or $C_2$-$C_2$ of FIG. 1;

FIG. 5 is an enlarged perspective view of the embodiment of the base slab shown in FIG. 1, such base slab comprised of a plurality of base members placed in mutual juxtaposed position;

FIG. 6 is similar view of the base slab shown in FIG. 5, further having coupling means to rigidly couple each of the individual base members making up such base slab together so as to assist in retaining such base members together in such base slab when multi-axial loads are applied to the tower affixed to the concrete foundation of the present invention;

FIG. 7 is a perspective view of a second embodiment of the present invention, have a base slab of modular construction but different from the base slab in FIGS. 1-6;

FIG. 8 is a partial cross-sectional view of the foundation of FIG. 7, taken along plane F-F;

FIG. 9 is an enlarged full cross-sectional view of the foundation of FIG. 1, taken along plane $E_1$-$E_1$ or $E_2$-$E_2$ of FIG. 1;

FIG. 17 is an enlarged full cross-sectional view of the foundation of FIG. 15, taken along plane H-H of FIG. 15; and FIG. 18 is a perspective view of a further variation of the invention, where the foundation is constructed on rock and the anchor rods further extend through the base slab into the rock to further assist in firmly anchoring the foundation to withstand lateral forces exerted on the attached tower (not shown).

DETAILED DESCRIPTION OF SOME PREFERRED EMBODIMENTS

Figure 4:
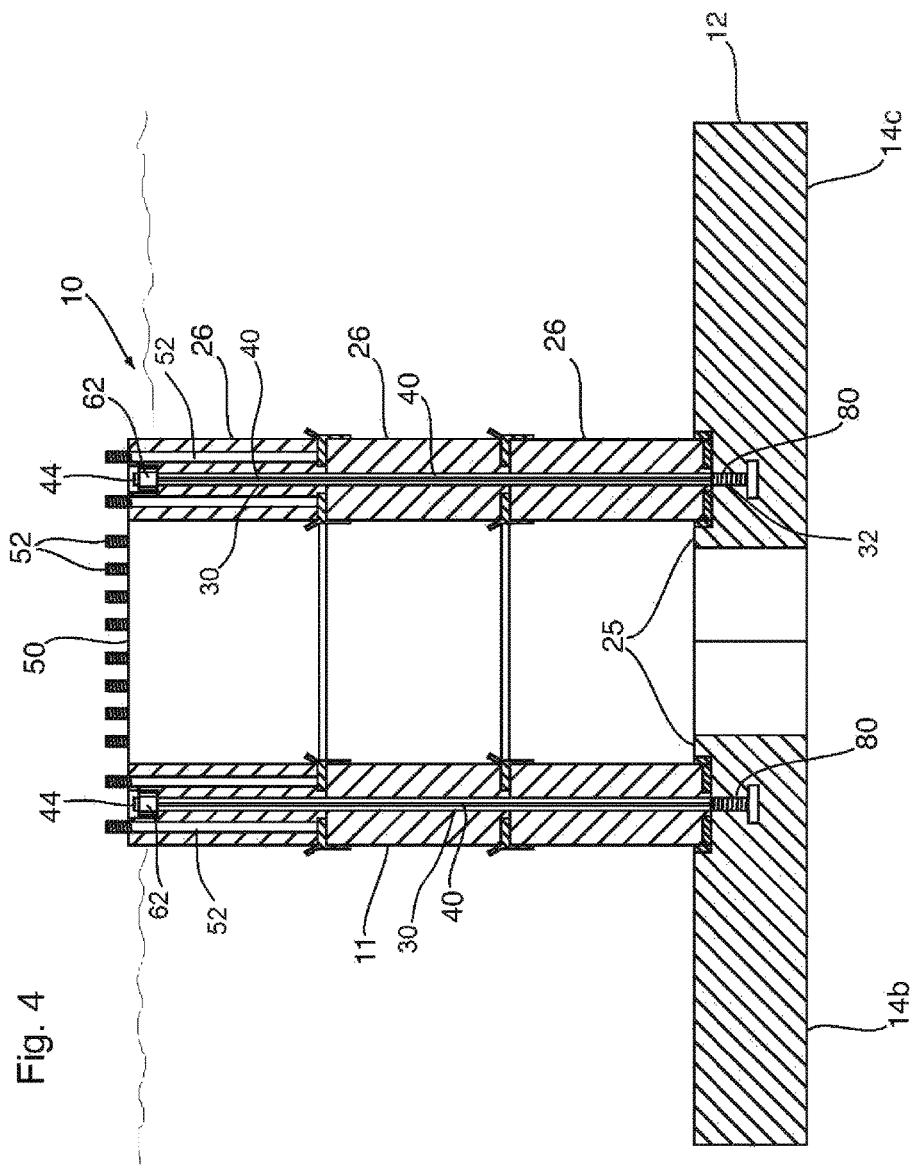
FIG. 4 is a full cross-sectional view of the foundation of FIG. 1, taken along plane A-A of FIG. 1.

In the following description, similar components in the various drawings are identified with corresponding same reference numerals.

Reference to an element in the singular, such as by use of the article "a" or "an" is not intended to mean "one and only one" unless specifically so stated, but rather "one or more".

Figure 13:
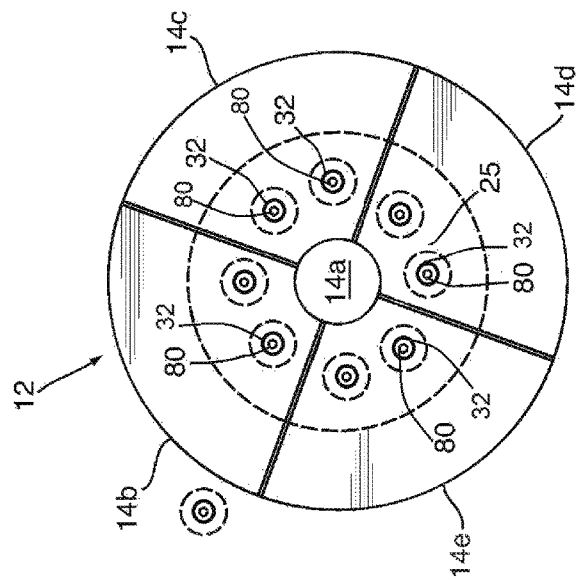
FIG. 13 is a top view on the base slab of FIG. 12.
Figure 14:
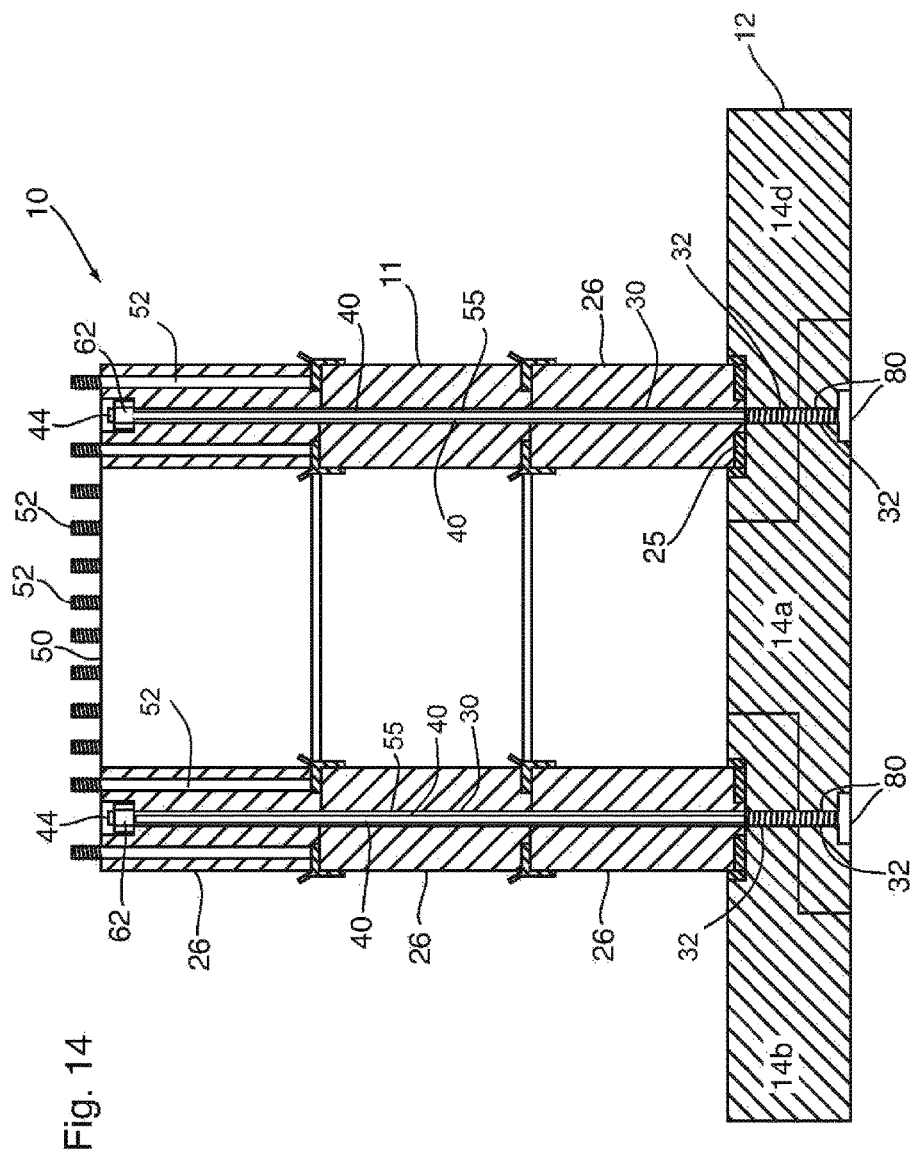
FIG. 14 is an enlarged full cross-sectional view of the foundation of FIG. 13, taken along plane G-G of FIG. 13.
Figure 16:
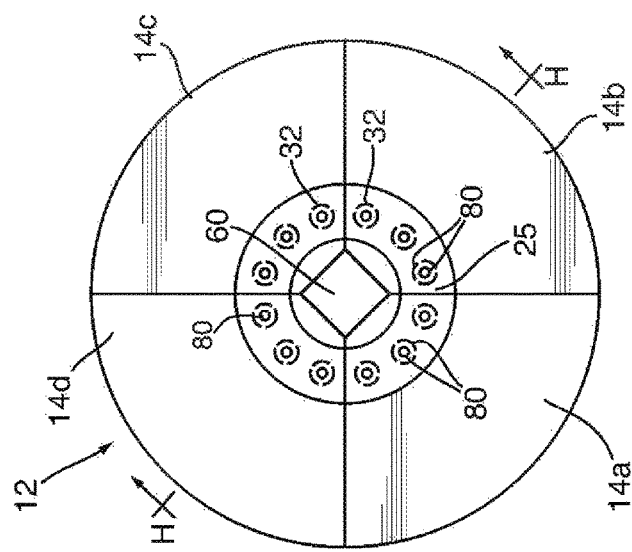
FIG. 16 is a top view on the base slab of FIG. 15.

FIG. 1 (and related FIGS. 2-6 depicting various components and cross-sections of the embodiment of FIG. 1), FIG. 7 (and related FIGS. 8-11 depicting various components and cross-sections of the embodiment of FIG. 7), FIG. 12 (and related FIGS. 13-14 depicting various components and cross-sections of the embodiment of FIG. 12) and FIG. 15 (and related FIGS. 16-17 depicting various components and a cross-section of the embodiment of FIG. 15) show, respectively, perspective views of four (4) separate variations of modular foundation 10 of the present invention for supporting a tower, such as a telecommunications tower (typically a cell phone tower) or a wind turbine tower (not shown). The cell phone or wind turbine tower (not shown) is adapted for coupling to the upper end 50 of modular foundation 10. FIG. 18 shows yet a further variation, where the base slab 12 overlies rock, wherein the invention is able to capitalize on the further stabilizing properties of such underlying rock. In such further variation the anchor rods extend not only through the pipe members 26, but also through the base slab 14 and into and are anchored in the underlying rock, but again nonetheless continue to fulfill their intended roles of applying compressive loading to the pipe members and at the same time securing the pipe members 26 on the base slab 12 and retaining the modular base members 14 together in an integral base slab 12.

Figure 15:
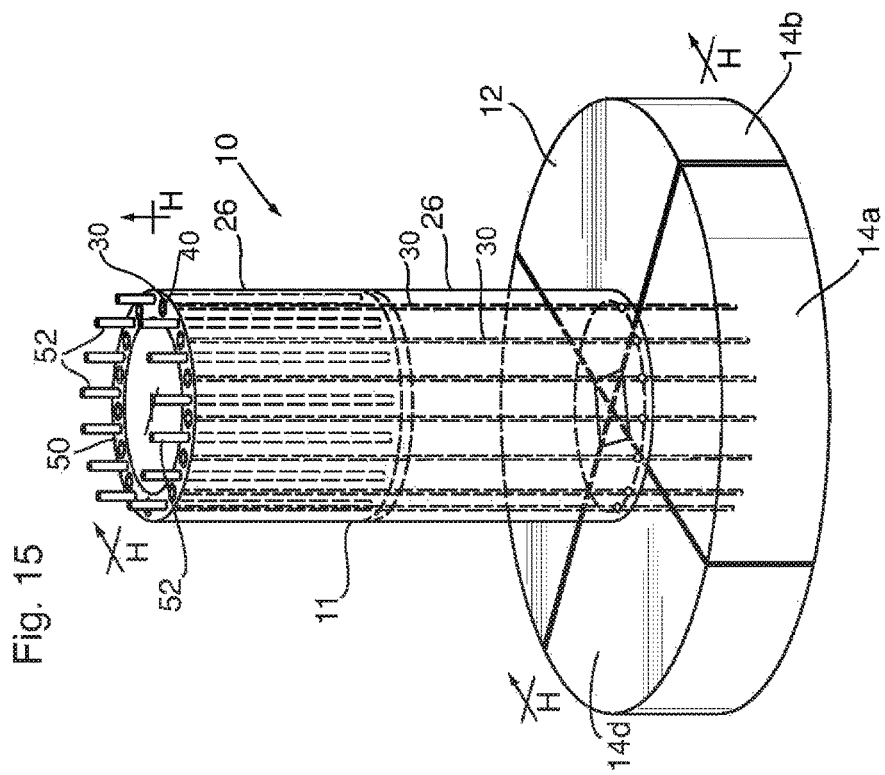
FIG. 15 is a perspective view of a fourth variation of the present invention, have a base slab of modular construction somewhat different from the base slab of the first, second, and third embodiments.

FIG. 1 and FIG. 15 together depict a particular embodiment of foundation 10 where the base slab 12 is comprised of a plurality of pre-cast pie-shaped modular base members 14 which are together arranged in side-by-side juxtaposed position and secured together as explained below to ultimately together form base slab 12.

FIG. 1 shows a sub-embodiment wherein pre-cast pie-shaped modular base members 14a, 14b, 14c, 14d together forming base slab 12 are each constructed of a series of structural webs, and are not generally solid, providing the advantage that fill such as sand, gravel, or rocks may be provided to overlie and be partially contained within individual base members 14a, 14b, 14c, 14d to thereby add additional inexpensive ballast for foundation 10.

FIG. 15 shows an alternative sub-embodiment where the pie-shaped modular base members 14a, 14b, 14c, 14d are each entirely formed of pre-cast solid concrete, preferentially further reinforced with steel rebar cast in the concrete of each of the pie-shaped base members.

By way of contrast, FIG. 7 (and FIGS. 8-11 showing various components and cross-sections thereof) and FIG. 12 (and FIGS. 13-14 showing various components and cross-sections thereof) together depict an alternative embodiment of modular foundation 10 where the base slab 12 is formed from a plurality of pre-cast modular base members, having a first (central) base member 14a which overlaps remaining modular base members 14b, 14c, 14d, & 14e, all of such modular base members being fixedly coupled together via anchor rods 20 as more fully explained below.

FIG. 7 shows a sub-embodiment wherein a first modular base member 14a is configured to overlap with remaining modular base members 14b, 14c, 14d, & 14e.

Figure 12:
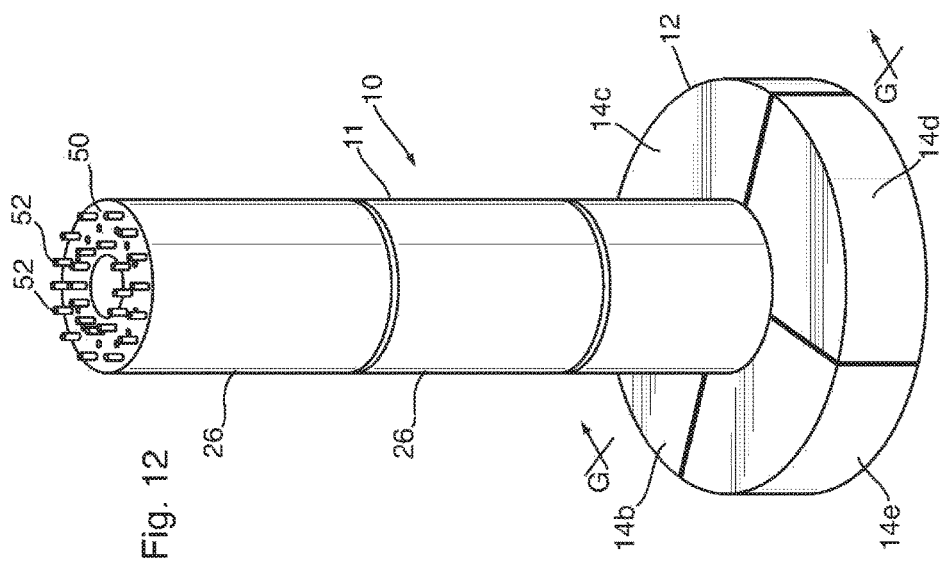
FIG. 12 is a perspective view of a third embodiment of the present invention, have a base slab of modular construction but different from the base slab of the first and second embodiments.

FIG. 12 shows another sub-embodiment wherein first base member 14a overlaps with remaining base members 14b, 14c, 14d, & 14e in a different manner.

Details and advantages of the two aforementioned alternative embodiments for base slab 12 and its ultimate manner of incorporation into and retention by foundation 10 of the present invention are more fully explained below.

With Regard to Embodiment Shown in FIGS. 1-6 and 15-17

FIG. 1 (and FIGS. 2-6) and FIG. 15 (and FIGS. 16-17) show one embodiment of modular foundation 10 in assembled form. A base slab 12 is provided comprised of a plurality of pre-cast pie-shaped modular concrete sub-modules/base members 14a, 14b, 14c, 14d arranged together in juxtaposed position as shown. Upwardly-facing surfaces 16a, 16b, 16c, 16d on respective pre-cast concrete sub-modules/base members 14a, 14b, 14c, 14d together form a horizontal pedestal-mounting surface 25 on which hollow, pre-cast concrete pipe members 26 may be stacked in end-to-end position to form a vertical column or pedestal, terminating in a tower interface/upper end 50.

In the variation shown in FIG. 1 (and FIGS. 2-6), each of pie-shaped base members 14a, 14b, 14c, and 14d are each preferably pre-cast with a respective base or floor 18a, 18b, 18c, 18d, which not only increases the total mass of base slab 12 when base members 14a, 14b, 14c, and 14d are affixed together in the manner described below, below but further acts to in effect create individual respective compartments 19a, 19b, 19c, and 19d within each base member which may then be filled with sand, rock, gravel, or the like, to further increase the mass moment of inertia of base slab 12 and consequently further increase the ability of foundation 10 to resist tipping forces exerted on it by the tower (not shown) to which it is coupled.

In the variation shown in FIG. 15 (and FIGS. 16-17), pie-shaped modular base members 14a, 14b, 14c, and 14d may be of solid concrete, and may further be truncated at the otherwise pointed extremity of each pie-shaped member 14a, 14b, 14c, and 14d to form, when arranged together in juxtaposed position to form base slab 12 as shown in FIG. 16, an open hollow area 60 situated centrally in base slab 12.

In all embodiments, each of modular base members 14a, 14b, 14c and 14d have a plurality of parallel, spaced-apart anchor rod retaining apertures 32 (see FIGS. 5, 6), spaced in a circular arc about respective upwardly-facing horizontal surfaces 16a, 16b, 16c, 16d thereof and extending vertically downwardly therefrom and containing therewithin an elongate anchor rod 40, preferably threaded at each end thereof.

Cylindrical pre-cast concrete pipe members 26 stacked end-to end on pedestal mounting surface 25 to form vertical column 11 possess at an upper end thereof a tower interface 50. Tower coupling means, typically threaded rods 52 cast in uppermost pipe member 26 about a circular periphery of tower interface 50, are provided to allow bolting of tower (not shown) to the upper end of the vertical column 11.

A lowest of cylindrical pipe members 26 within vertical column 11 is positioned on pedestal-mounting surface 25 so that a lower circular periphery of such lowest pipe member 26 is positioned on and overlies respective portions of upwardly-facing horizontal surfaces 16a, 16b, 16c, and 16d of each of respective modular base members 14a, 14b, 14c and 14d.

Each of stacked pipe members 26 possess a plurality of parallel, spaced-apart longitudinally-extending anchor rod containing apertures 30 corresponding in number to said plurality of longitudinally-extending anchor rod retaining apertures 32 in said base members. Each anchor rod containing aperture 30 extends a vertical height of each pipe members. Anchor rod containing apertures 30 are uniformly spaced around a periphery of each of said pipe members 26 in a manner to allow, upon pipe members 26 being stacked one upon the other, alignment of anchor rod containing apertures 30, as well as alignment with respective correspondingly spaced anchor rod retaining apertures 32 in each of base members 14, 14b, 14c and 14d.

Anchor rods 40 are inserted in and contained within both the anchor rod containing apertures 30 as well as the anchor rod retaining apertures 32.

Each of base members 14a, 14b, 14c and 14d having anchor rod securement means situated at each of said anchor rod retaining apertures 32 and cast into each respective base member, which secure one end of a respective of anchor rods 40 to a respective base member 14a, 14b, 14c and 14d. In a preferred embodiment, the anchor rod securement means comprises a metallic threaded insert 80, cast within a respective base member 14a, 14b, 14c and 14d and situated at a base of each of said anchor rod retaining apertures 32 in base members 14a, 14b, 14c and 14d. Threaded insert 80, when one end of a respective of said anchor rods 40 is threadably inserted therewithin, secures said one end of said anchor rod 40 to a respective of said base members 14a, 14b, 14c and 14d.

Anchor rods 40 are generally comprised of high tensile strength steel which is adapted, when threaded nuts 62 are inserted on an upper threaded end 44 thereof and tightened, to not only exert a post-compressive stress on pipe members 26 to negate or reduce any tensile loads which may be applied thereon by virtue of the tower coupled to foundation 10, but to also in conjunction with the lowest pipe member 26 in column 11, "tie" the individual base members together into the integral base slab 12 thereby retain them in the juxtaposed position.

In the embodiment of the base slab 12 shown in FIG. 6, each of base members 14a, 14b, 14c and 14d may further be provided with coupling means to couple said base members 14a, 14b, 14c and 14d together in said mutually juxtaposed position to thereby better distribute forces applied to one of base members to other base members 14a, 14b, 14c and 14d to thereby distribute such forces over other regions of the base slab 12. In the embodiment shown in FIG. 6, the coupling means comprises a plurality of apertures 39 in webs 41, through which threaded tie rods 70 are passed, having threaded ends on which threaded nuts 71 are provided, which when tightened o thereby secure each of respective base members 14a, 14b, 14c and 14d together. Other coupling means will now of course occur to persons of skill in the art, and such other means are all contemplated within the meaning of coupling means.

Anchor rods 40 may be of the type made by DYWIDAG-Systems International Canada Ltd. of Ontario, Canada, and selected of a size, numerical number, and tensile stress having regard to the compressive load needed to be imparted on pipe members 26 for such pipe members 26 to resist tensile loads applied when lateral loading is applied to the tower (not shown) attached thereto.

With Regard to Embodiment Shown in FIGS. 7-14

The embodiment shown in FIGS. 7-14 differs from the above-described embodiment depicted in FIGS. 1-6 and FIGS. 15-17 as regards the configuration of base slab 12.

Figure 10:
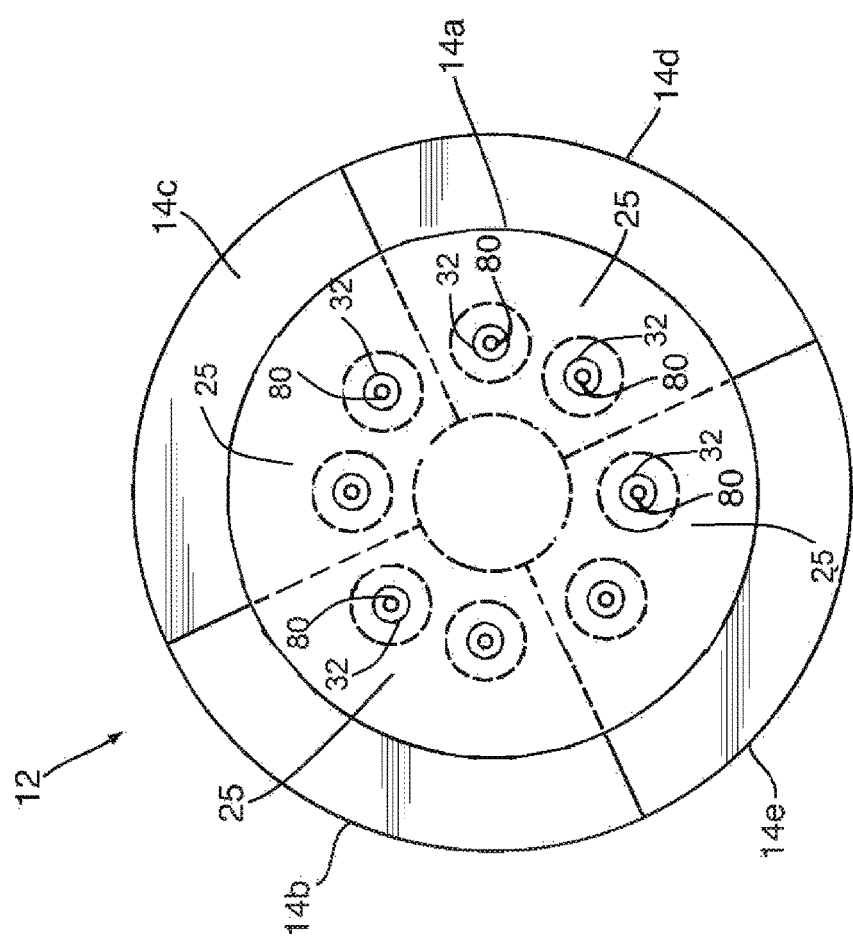
FIG. 10 is a top view on the base slab of FIG. 7.
Figure 11:
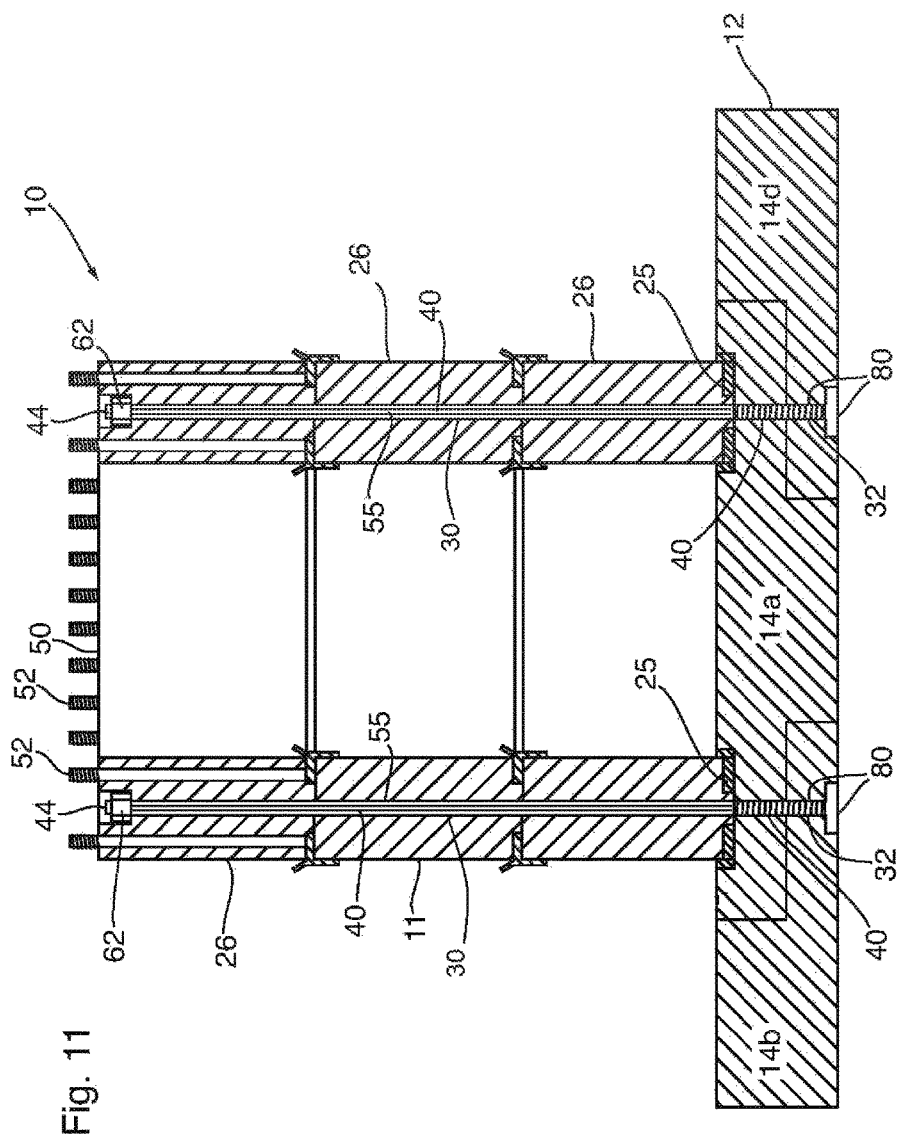
FIG. 11 is an enlarged full cross-sectional view of the foundation of FIG. 7, taken along plane D-D of FIG. 7.

In a first sub-embodiment, best shown in FIGS. 7, 10 & 11, base slab 12 comprises a first central base member 14a which forms horizontal pedestal-mounting surface 25. First base member 14a is surrounded about its outer periphery by a plurality of additional base members 14b, 14c, 14d and 14e. While a plurality of four (4) additional base members are shown surrounding periphery of first base member 14a, as will be apparent to a person of skill in the art, clearly any plurality of base members may be employed to surround first base member 14a.

An upper portion of first base member 14a overlaps, in a region immediately beneath a lowermost pipe member 26, a portion of each of outer base members 14b, 14c, 14d and 14e. Metallic inverted "t" shaped threaded inserts 80 are cast at the terminal end of each anchor rod containing aperture 32 in each of remaining base members 14b, 14c, 14d and 14e, to allow respective ends of anchor rods 40 to be threadably inserted in threaded inserts 80. Accordingly, when threaded nuts 62 are tightened, anchor rods 40 not only apply compressive loading to pipe members 26 but further secure the overlapping portions of base members 14b, 14c, 14d and 14e to the inner first base member 14a, thereby securing all of outer base members 14a, 14b, 14c, 14d and 14e and inner first base member 14a in an integral base slab 12.

In the similar second sub-embodiment, best shown in FIGS. 12-14, base slab 12 comprises a first central base member 14a, which is surrounded about its outer periphery by a plurality of additional base members 14b, 14c, 14d and 14e, which in the region of overlap with first base member 14a together form horizontal pedestal-mounting surface 25. Again, while a plurality of four (4) additional base members are shown surrounding periphery of first base member 14a, as will be apparent to a person of skill in the art, clearly any plurality of base members may be employed to surround first base member 14a.

In such second sub-embodiment, a lower portion of first base member 14a overlaps, in a region immediately beneath a lowermost pipe member 26, a portion of each of outer base members 14b, 14c, 14d and 14e. Metallic inverted "t" shaped threaded inserts 80 are cast at the terminal end of each anchor rod retaining aperture 32 in first base member 14a, to allow respective ends of anchor rods 40 which pass through anchor rod containing apertures 32 in base members 14b, 14c, 14d and 14e to allow such ends to be threadably inserted in respective threaded inserts 80 in base members 14b, 14c, 14d and 14e. Again, when threaded nuts 62 are tightened, anchor rods 40 not only apply compressive loading to pipe members 26 but further secure the overlapping portions of base members 14b, 14c, 14d and 14e to the inner first base member 14a, thereby securing all of base members 14a, 14b, 14c, 14d and 14e in an integral base slab 12.

In all embodiments, but illustrated only in FIGS. 8, 9, 11 & 14, the anchor rod containing apertures 30 in each of said pipe members 26 may each further contain an elongate hollow plastic sleeve 55 extending substantially a length of each of said anchor rod containing apertures 30, possessing both exterior and interior undulations (not shown) along the exterior and interior length thereof. Pipe members 26 are each cast with sleeves 55 surrounding respectively interior peripheries of each of said anchor rod containing apertures 30 in each of said pipe members. At the time of, or after anchor rods 40 are inserted in anchor rod containing apertures 30, grout may further be injected in plastic sleeves 55 to bond said anchor rods to sleeves 55 and prevent incursion of moisture and possible corrosion of anchor rods 40.

Manner of Assembly of Modular Tower Foundation

Advantageously, due to the above-described modular construction, each of the discrete modules, namely each of the plurality of individual pipe members 25 and each of plurality the base members 14a, 14b, 14c, 14d (and 14e, in the case of the second embodiment) of the tower foundation 10 of the present invention may advantageously, be pre-cast off site, under controlled temperature and curing conditions.

Thereafter, each of each of the plurality of individual pipe members 25 and each of plurality the base members 14a, 14b, 14c, 14d (and 14e, in the case of the second embodiment) of the tower foundation 10 may be trucked to site. Due to the smaller size and modular nature, the weight loading on the transporting truck is more likely to be in compliance with local highway loading regulations.

At site, the base members 14a, 14b, 14c, 14d (and 14e, in the case of the second embodiment) are arranged in mutual juxtaposed arrangement.

If the ultimate configuration is that of FIG. 1 or FIG. 15 having the depicted final base slab 12 configuration, pie-shaped base members 14a, 14b, 14c, 14d are arranged to form a circular base. Preferably, the base members 14a, 14b, 14c, and 14d are further secured to each other, using the above-described securement means and as shown in FIG. 6. For the embodiment of base slab 12 shown in FIG. 1, fill in the form of sand, gravel, and/or rock, may optionally be inserted in formed compartments 18a, 18b, 18c, 18d within base slab 12 to add additional ballast and increase the mass moment of inertia of the so-formed base slab 12.

If the ultimate configuration is that of FIGS. 7, 10 & 11, base members 14b, 14c, 14d and 14e are arranged in mutual juxtaposed position to form a circular disk, the center of which being the desired location of the tower. First base member 14 inserted in the middle of base members 14b, 14c, 14d, and 14e thereby overlapping a portion of each. Care must be taken to ensure alignment of anchor rod retaining apertures 32 in base members 14b, 14c, 14d, and 14e with anchor rod containing apertures 30 in first base member 14a.

If the ultimate configuration is that of FIGS. 12, 13 & 14, first base member 14a is positioned at the desired site of the tower, and base members 14b, 14c, 14d and 14e are arranged in mutual juxtaposed position therearound to form a circular disk, a portion of each overlapping a portion of the periphery of first base member 14a. Care must be taken to ensure alignment of anchor rod retaining apertures 32 in base members 14b, 14c, 14d, and 14e with anchor rod containing apertures 30 in first base member 14a.

Regardless of the embodiment being constructed, the resultant base slab 12 forms a circular disc, with a horizontal pedestal-mounting surface 25.

A lowermost pipe member 26 is then placed on pedestal-mounting surface 25, with anchor rod containing apertures 30 therein aligned with anchor rod retaining members 32 in base slab 14. Thereafter, one or more additional pipe members 26 are placed on lower pipe member 26, and grout may be inserted at the interface between the pipe members 26. When stacking additional pipe members 26, care must be taken to ensure alignment of anchor rod containing apertures 30 in each of the respective pipe members 26.

Anchor rods 40 are then inserted into anchor rod containing apertures, and threadably inserted into threaded inserts 80 in base slab 12. Thereafter, threaded nuts 62 are applied to opposite ends of anchor rods 40, and tighted so as to apply a compressive force to pipe members 26 and retain the foundation 10 together as an integral unit. If the foundation is constructed below ground level, fill in the form of dirt, rock, sand, gravel, or mixtures thereof may then be applied on top of the base slab and surrounding the formed pedestal 11 of the foundation 10, to thereby further increase the resistance of foundation 10 to toppling due to lateral loads applied to the affixed tower (not shown).

In a further refinement of the invention, where the base slab 14 rests on rock 77 as depicted in FIG. 18, the one (lowest) end of the anchor rods 40 which otherwise would be threadably secured in threaded inserts in base members 14, may instead pass through base members 14 and be threadably retained within the rock below the base slab 14, as shown in FIG. 18. In such further refinement of the invention, grout may be pumped down the anchor rod containing apertures 30 in each of the pipe members 26 and base slab 14 to assist in securing such lower end of anchor rods 40 in the underlying rock. In such manner the anchor rods 40, when tensioned, operate in the same manner as previously described, namely to both apply a compressive stresses on the pipe members 26 and to secure, in combination with the lowermost pipe member 26, the discrete base members 14 together and render the foundation 10 and integral structure.

The above description of some embodiments of the present invention is provided to enable any person skilled in the art to make or use the present invention.

For a complete definition of the invention and its intended scope, reference is to be made to the summary of the invention and the appended claims read together with and considered with the detailed description and drawings herein on a purposive interpretation thereof.

I claim:

1. A modular concrete foundation for supporting a tower, comprised of a plurality of pre-cast concrete modules, and including:
   a plurality of pre-cast concrete base members, each having a substantially planar upwardly-facing horizontal surface thereon, each base member arranged in mutually juxtaposed position in a circular arc to form a modular base slab wherein said upwardly-facing surfaces of each of said base members together form a horizontal pedestal-mounting surface thereon, each so-formed modular base slab having a plurality of centrally-located, parallel, spaced-apart anchor rod-retaining apertures therein spaced in a circle on said horizontal pedestal-mounting surface, each anchor rod-retaining aperture extending vertically downwardly from said horizontal pedestal-mounting surface and containing therewithin anchor rod securement apparatus cast into each respective base member at the location of each anchor-rod-retaining aperture therein which secure one end of an elongate anchor rod to a respective base member;
   a plurality of substantially cylindrical, hollow pre-cast concrete pipe members, each having an outer circumference smaller than an outer circumference of said modular base slab formed of said base members, each of said pipe members mounted one upon the other in vertical stacked arrangement to form a vertical pedestal having a hollow interior and extending vertically upwardly from a central region of said horizontal pedestal-mounting surface of said modular base slab, an uppermost of said pipe members having at an uppermost portion thereof coupling means disposed about a circular periphery thereof to allow coupling to said tower mounted thereon, a lowermost of said plurality of stacked pipe members positioned on said horizontal pedestal-mounting surface so that a lower circular periphery of said lowermost of said stacked pipe members is positioned on and overlies respective portions of said upwardly-facing horizontal surfaces of each of said base members;

each of said stacked pipe members having a plurality of parallel, spaced-apart longitudinally-extending anchor rod-containing apertures therein corresponding in number to said plurality of longitudinally-extending anchor rod-retaining apertures in said modular base slab formed of said base members, each anchor rod containing aperture extending a vertical height of a respective of said pipe members and uniformly spaced around a periphery of each of said pipe members in a manner to allow, upon said pipe members being stacked one upon the other, alignment of said anchor rod-containing apertures in each of said pipe members with corresponding anchor rod-containing apertures in each of said other pipe members and said anchor rod-retaining apertures in each of said base members; and a plurality of elongate anchor rods, corresponding in number to said plurality of longitudinally-extending anchor rod-retaining apertures in said base members and said anchor rod-containing apertures in each of said pipe members, each anchor rod positioned in a corresponding of said anchor rod-containing apertures in said pipe members and coupled at one end to said anchor rod securement means within said anchor-rod retaining aperture in said modular base slab, one end of each of said plurality of elongate anchor rods positioned in a corresponding one of said anchor rod-retaining apertures in said base members and at another mutually-opposite end having tensioning means imparting a tensile loading on each of said anchor rods;

wherein said plurality of elongate anchor rods pass through respective of said anchor rod-containing apertures in said pipe members and into said anchor-rod securement aperture in said modular base slab and when tensioned then impart a compressive load on said pipe members and retain said pipe members together in a vertical stacked relation and further retain said lowermost of said pipe members overlying and securely affixed to said modular base slab and further retain or assist in retaining all of said base members rigidly together in said juxtaposed position in said circular arc and thus retain said base slab in integral unitary form.

2. The modular concrete foundation for supporting a tower as claimed in claim 1, wherein said base members are retained together in said mutual juxtaposed position, at least in part, by said anchor rods in said lowest of said pipe members extending therefrom into said anchor rod-retaining apertures in said base members.

3. The modular concrete foundation for supporting a tower as claimed in claim 1, each of said base members further having coupling means to couple said base members together in said mutually juxtaposed position and to further distribute forces applied to one base member to other base members to thereby distribute such forces over other regions of the base slab.

4. The modular concrete foundation for supporting a tower as claimed in claim 1, wherein said anchor rod securement apparatus comprises a metallic threaded insert, cast within a respective base member and situated within said anchor rod-retaining apertures in said base members, which threaded insert when one end of a respective of said anchor rods is threadably inserted therewithin secures said one end of said anchor rod to a respective of said base members.

5. The modular concrete foundation for supporting a tower as claimed in claim 1, wherein said base members comprise pie-slice segments of a circular disk, and when arranged in said mutually juxtaposed position together form a circular disk for said modular base slab.

6. The modular concrete foundation for supporting a tower as claimed in claim 1, wherein:
said anchor rod-containing apertures in each of said pipe members each further contain an elongate hollow plastic sleeve extending substantially a length of each of said anchor rod-containing apertures, possessing both exterior and interior undulations; and
wherein said pipe members are each cast with said sleeves surrounding respectively interior peripheries of each of said anchor rod containing apertures in each of said pipe members.

7. The modular concrete foundation for supporting a tower as claimed in claim 6, wherein when said anchor rods are inserted in said anchor rod-containing apertures, grout is further injected in said plastic sleeves to bond said anchor rods to said sleeves.

8. The modular concrete foundation for supporting a tower as claimed in claim 1, wherein each of said pipe members, when assembled in said stacked configuration, have grout inserted at an interface between each of said pipe members.

9. The modular concrete foundation for supporting a tower as claimed in claim 1, wherein each of said pipe members and base members have been cast off-site and transported by truck to a site for assembly.

10. A modular foundation for supporting a tower, comprised of a plurality of pre-cast concrete modules, namely:
a plurality of discrete pre-cast concrete base members arranged in juxtaposed position to form a modular base slab having a horizontal pedestal-mounting surface, said horizontal pedestal-mounting surface comprised of a first of said base members having a periphery, and remaining base members when in said juxtaposed position surrounding said first base member and said periphery thereof, portions of a periphery of each of said remaining base members overlapping with or being overlapped by a portion of said periphery of said first base member, said modular base slab having a plurality of mutually parallel, centrally-located spaced-apart anchor rod-containing apertures spaced in a circular arc on said horizontal pedestal-mounting surface and extending vertically downwardly from said horizontal pedestal-mounting surface, beneath which and in alignment therewith are located respectively a corresponding plurality of anchor rod-retaining apertures within said base slab, each containing therewithin anchor rod securement apparatus cast into a respective of said base members at the location of each anchor rod-retaining aperture therein which secure one end of an elongate anchor rod to a respective of said base members;

a plurality of substantially cylindrical, hollow pre-cast concrete pipe members, each having an outer circumference smaller than an outer circumference of said base slab formed of said base members, each of said pipe members mounted one upon the other in vertical stacked arrangement to form a vertical pedestal having a hollow interior and extending vertically upwardly from a central region of said horizontal pedestal-mounting surface of said modular base slab, an uppermost of said pipe members having, at an uppermost portion thereof, a plurality of coupling means uniformly radially spaced about a circular periphery thereof to permit coupling of said tower thereto, a lowermost of said plurality of stacked pipe members positioned on said pedestal-mounting surface so that a lower circular periphery of said lowermost of said stacked pipe members is positioned on and overlies said pedestal-mounting surface of said modular base slab;

each of said stacked pipe members having a plurality of parallel, spaced-apart longitudinally-extending anchor rod-containing apertures therein corresponding in number to said plurality of longitudinally-extending anchor rod-containing apertures in said pedestal-mounting surface, each anchor rod-containing aperture in said pipe member extending a vertical height of a respective of said pipe members and uniformly spaced around a periphery of each of said pipe members in a manner to allow, upon said pipe members being stacked one upon the other in vertical stacked arrangement, alignment of said anchor rod-containing apertures of each of said pipe members with corresponding anchor rod-containing apertures of each of said other pipe members and said anchor rod-retaining apertures in said modular base slab; and a plurality of anchor rods, corresponding in number to said plurality of longitudinally-extending anchor rod-containing apertures in said pipe members, each positioned in a corresponding of said anchor rod-containing apertures in said pipe members and said modular base slab, one end of each of said plurality of anchor rods positioned in a corresponding one of said anchor rod-retaining apertures in said modular base slab and at another mutually opposite end having tensioning means imparting a tensile loading on each of said anchor rods;

wherein said plurality of anchor rods pass through respective of said anchor rod-containing apertures in said pipe members and into said anchor-rod securement apparatus in said modular base slab and when tensioned then impart a compressive load on said pipe members and retain said pipe members together in said vertical stacked arrangement and to further retain said lowermost of said pipe members overlying and securely affixed to said modular base slab and further retain or assist in retaining all of said base members rigidly together in said juxtaposed position to form said modular base slab in integral unitary form.

11. The modular foundation as claimed in claim 10, wherein said horizontal pedestal-mounting surface is comprised of said first of said base members, said first of said base members having therein said anchor rod-containing apertures; and wherein said remaining base members possess said anchor rod-retaining apertures, vertically aligned respectively with said anchor rod-containing apertures in said first base member.

12. The modular foundation as claimed in claim 10, wherein said horizontal pedestal-mounting surface is comprised of a portion of said periphery of said remaining base members overlapping said first base member, each of said remaining base members having therein said anchor rod-containing apertures; and wherein said first base member possesses said anchor rod-retaining apertures, vertically aligned respectively with said anchor rod-containing apertures in said remaining base members.

13. The modular foundation as claimed in claim 11, wherein said anchor rod-retaining apertures are further provided with and said anchor securement apparatus comprises metallic threaded inserts, which secure one end of a respective of said anchor rods to said modular base slab.

14. The modular foundation as claimed in claim 12, wherein said anchor rod-retaining apertures are further provided with and said anchor securement apparatus comprises metallic threaded inserts, which secure one end of a respective of said anchor rods to said modular base slab.

15. A modular foundation for supporting a tower, comprised of a plurality of pre-cast concrete modules, and including:

a plurality of pre-cast concrete base members, each having a substantially planar upwardly-facing horizontal surface thereon, each base member arranged in mutually juxtaposed position in a circular arc to form a modular base slab wherein said upwardly-facing surfaces thereon together form a horizontal pedestal-mounting surface, each so-formed modular base slab having a plurality of centrally-located, parallel, spaced-apart anchor rod-containing apertures therein spaced in a circle on said horizontal pedestal-mounting surface, each anchor rod-containing aperture extending vertically downwardly from said upwardly-facing horizontal surface and having an anchor rod pass therethrough;

a plurality of substantially cylindrical, hollow pre-cast concrete pipe members, each having an outer circumference smaller than an outer circumference of said modular base slab formed of said base members, mounted one upon the other in vertical stacked arrangement to form a vertical pedestal of uniform diameter and having a hollow interior and extending vertically upwardly from a central region of said horizontal pedestal-mounting surface on said modular base slab, an uppermost of said pipe members having at an uppermost portion thereof coupling means about a circular periphery thereof to allow coupling to said tower mounted thereon, a lowermost of said plurality of stacked pipe members positioned on said pedestal-mounting surface so that a lowermost circular periphery of said lowermost of said stacked pipe members is positioned on and overlies respective portions of said upwardly-facing horizontal surfaces of said base members;

each of said stacked pipe members having a plurality of parallel, spaced-apart longitudinally-extending anchor rod-containing apertures therein corresponding in number to said plurality of longitudinally-extending anchor rod-containing apertures in said modular base slab formed of said base members, each anchor rod-containing aperture extending a vertical height of a respective of said pipe members and uniformly spaced around a periphery of each of said pipe members in a manner to allow, upon said pipe members being vertically stacked one upon the other, alignment of said anchor rod-containing apertures in each of said pipe members with corresponding anchor rod-containing apertures in each of other of said pipe members and said anchor rod-containing apertures in each of said base members;

a plurality of spaced-apart anchor rod securement apparatus, situated in a corresponding plurality of anchor rod-containing apertures in rock beneath said modular base slab and secured to said rock; and a plurality of elongate anchor rods, corresponding in number to said plurality of longitudinally-extending anchor rod-containing apertures in said modular base slab formed of said base members, each positioned in a corresponding of said anchor rod-containing apertures in said pipe members passing through said anchor rod-containing apertures in said modular base slab, one end of each of said plurality of anchor rods secured in said anchor rod securement apparatus in said rock beneath said base slab, and at another mutually-opposite end thereof proximate a circular periphery of said uppermost of said pipe members having tensioning means thereon imparting a tensile loading on each of said anchor rods;

wherein said plurality of anchor rods pass completely through respective of said anchor rod-containing apertures in said pipe members and in said modular base slab and are secured in said anchor-rod securement apparatus and when tensioned impart a compressive load on said pipe members and retain said pipe members together in vertically stacked relation and further retain said lowermost of said pipe members overlying said pedestal-mounting surface on said modular base slab and further retain or assist in retaining said base members rigidly together in said juxtaposed position in said circular arc and forming said modular base slab in integral unitary form.

\* \* \* \* \*